United States Patent
Cattin et al.

(10) Patent No.: US 7,345,745 B2
(45) Date of Patent: Mar. 18, 2008

(54) OPTICAL DEVICE FOR MEASURING THE DISPLACEMENT VELOCITY OF A FIRST MOVING ELEMENT WITH RESPECT TO A SECOND ELEMENT

(75) Inventors: Viviane Cattin, Saint Egreve (FR); Philippe Peltie, Saint Paul de Varces (FR); Bruno Flament, Saint Julien de Ratz (FR); William Fourcault, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 11/629,211

(22) PCT Filed: Jun. 24, 2005

(86) PCT No.: PCT/FR2005/001602

§ 371 (c)(1),
(2), (4) Date: Dec. 12, 2006

(87) PCT Pub. No.: WO2006/013246

PCT Pub. Date: Feb. 9, 2006

(65) Prior Publication Data

US 2007/0229798 A1    Oct. 4, 2007

(30) Foreign Application Priority Data

Jul. 6, 2004    (FR) ................... 04 07491

(51) Int. Cl.
*G01P 3/36* (2006.01)
(52) U.S. Cl. .......................... 356/28; 356/614
(58) Field of Classification Search .......... 356/3.1
See application file for complete search history.

(56) References Cited

U.S. PATENT DOCUMENTS

| | | | | |
|---|---|---|---|---|
| 6,035,053 A | * | 3/2000 | Yoshioka et al. | 382/104 |
| 6,118,132 A | | 9/2000 | Tullis | |
| 6,559,933 B1 | * | 5/2003 | Kirkpatrick et al. | 356/28.5 |
| 2005/0052635 A1 | * | 3/2005 | Xie et al. | 356/3.07 |
| 2006/0244945 A1 | * | 11/2006 | Yamaguchi | 356/5.03 |

FOREIGN PATENT DOCUMENTS

| | | |
|---|---|---|
| EP | 0 562 924 A1 | 9/1993 |
| EP | 0 595 605 A2 | 5/1994 |
| FR | 2 749 086 | 11/1997 |

* cited by examiner

*Primary Examiner*—Thomas H. Tarcza
*Assistant Examiner*—Tim Brainard
(74) *Attorney, Agent, or Firm*—Oliff & Berridge, PLC

(57) ABSTRACT

An optical device for measuring the displacement velocity of a first movable element in relation to a second element which is fixed to one of said elements and comprises two lasers transmitting two incident beams towards the other elements. The device including photosensitive linear arrays for front and rear detection which are substantially perpendicular to each other. Additional front and rear photosensitive linear arrays are disposed at a distance from the photosensitive front and rear linear arrays. A processing circuit is connected to the photosensitive linear arrays and determines the longitudinal and/or transversal displacement velocity of the movable element. The circuit also determines the distance between the device and the other element by means of optical triangulation and corrects the longitudinal and/or transversal displacement velocity value according of the said distance.

9 Claims, 2 Drawing Sheets

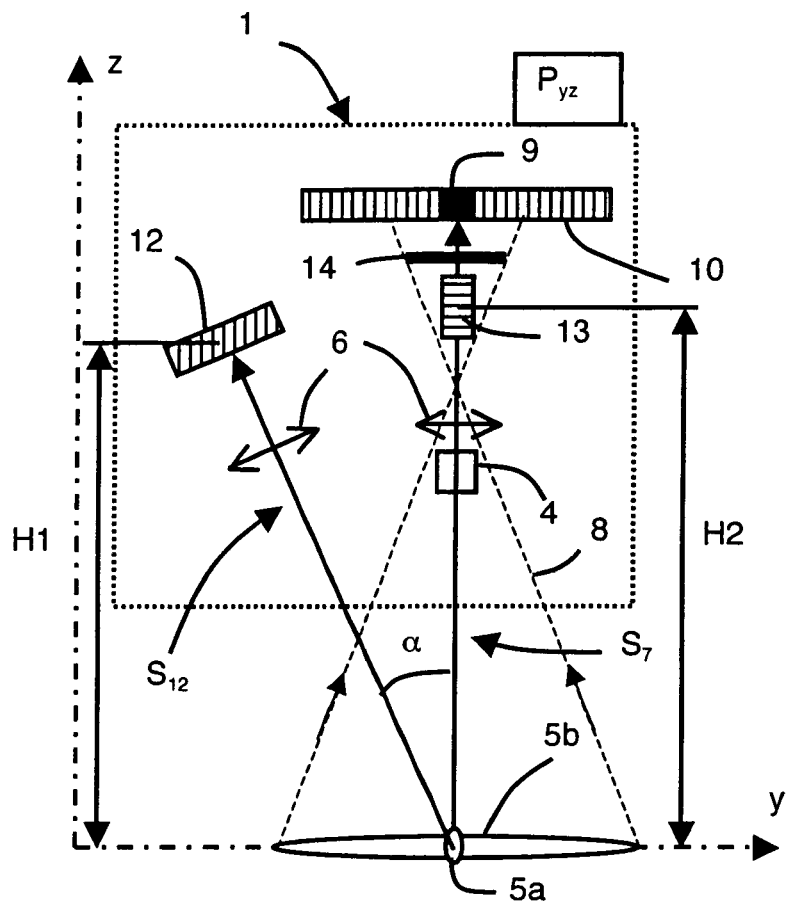
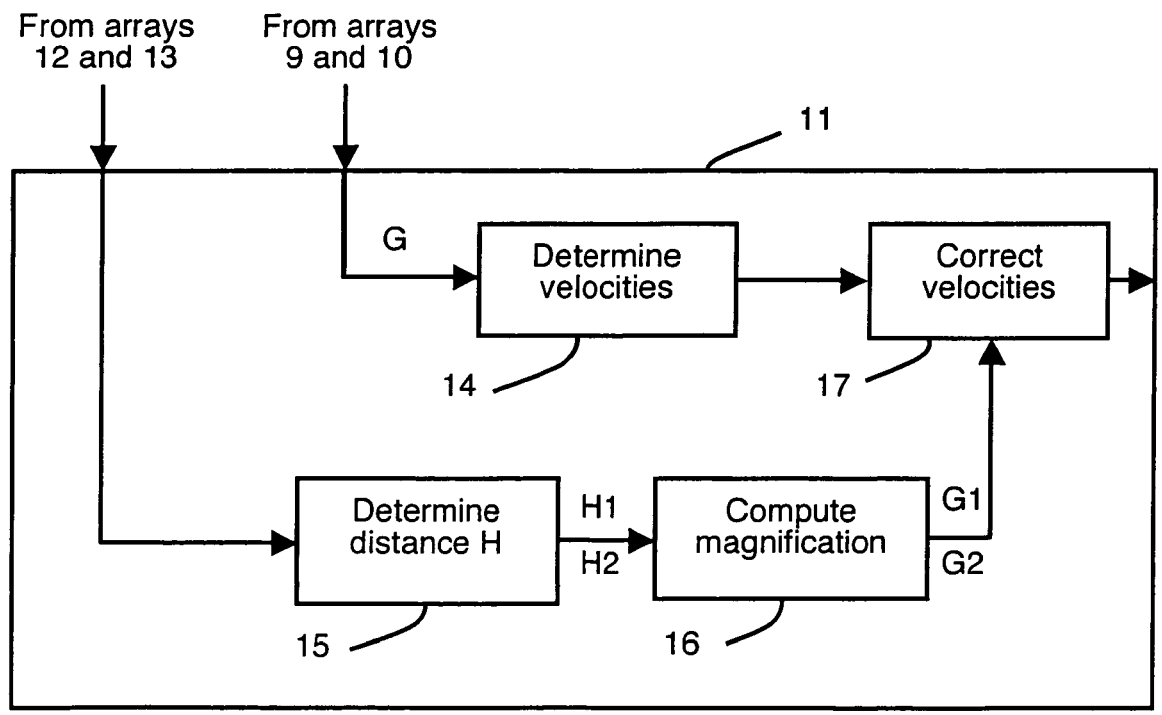
FIG. 3
FIG. 4

OPTICAL DEVICE FOR MEASURING THE DISPLACEMENT VELOCITY OF A FIRST MOVING ELEMENT WITH RESPECT TO A SECOND ELEMENT

BACKGROUND OF THE INVENTION

The invention relates to an optical device for measuring the displacement velocity of a first moving element with respect to a second element, the device being fixed to one of the two elements and comprising:
- means for emitting at least one incident light beam in the direction of the other element,
- means for receiving the light scattered by the other element, comprising front and rear detection means arranged substantially perpendicularly to one another,
- processing means, connected to the front and rear detection means and comprising means for determining the longitudinal and/or transverse displacement velocity of the moving element.

STATE OF THE ART

Several measuring techniques are known for measuring the displacement velocity of a first moving element with respect to a fixed second element, in particular the longitudinal and transverse displacement velocities.

The Patent FR-A-2749086 describes in particular a contact-less velocity measuring technique using a measuring device comprising two arrays of photodetectors aligned in a direction parallel to the path of a car, and a processing circuit for measuring and computing a wide displacement velocity range from about 0.1 km/h to 600 km/h by time correlation of the signals detected by the arrays.

However, as vehicles have a relative ground clearance that can vary greatly, this technique is often subject to error, as it does not take height variations into account. For example, for a mean height of 15 cm between the measuring device, fixed under the car, and the ground, a height variation of more or less 5 cm can be observed, i.e. a relative variation of more than 30%. Transverse velocity measurement is in particular greatly subject to error, as the magnification of the optical measuring device varies very greatly in such measuring devices.

The problem is partially solved by the document EP-A-0562924, which proposes using an optical measuring device with constant magnification, in a certain range of distance variation between the measuring device and the ground. However, this device is complex and not very functional, in particular if the distance variation is too large. Moreover, it reduces the possible transverse velocity measurement range, but does not enable the correlation base to be varied for estimation of very low longitudinal velocities. Moreover, as its illumination angle is reduced, this device presents a too small signal-to-noise ratio.

OBJECT OF THE INVENTION

The object of the invention is to remedy these shortcomings and in particular to provide an optical measuring device enabling the longitudinal and transverse displacement velocity of a moving element to be determined with precision.

According to the invention, this object is achieved by the appended claims, and more particularly by the fact that:
- the means for receiving comprise additional detection means,
- the processing means, connected to the additional detection means, comprise means for determining the distance between the device and the other element by optical triangulation, and correction means determining corrected values of the longitudinal and/or transverse displacement velocity according to said distance H and to the values supplied by the means for determining the longitudinal and/or transverse displacement velocity of the moving element.

BRIEF DESCRIPTION OF THE DRAWINGS

Other advantages and features will become more clearly apparent from the following description of particular embodiments of the invention given as non-restrictive examples only and represented in the accompanying drawings, in which:

FIG. 3 schematically represents a side view of the optical measuring device according to FIG. 1.

FIG. 4 is a diagram illustrating a particular embodiment of the processing circuit of the optical measuring device according to FIG. 1.

DESCRIPTION OF PARTICULAR EMBODIMENTS

Figure 1:
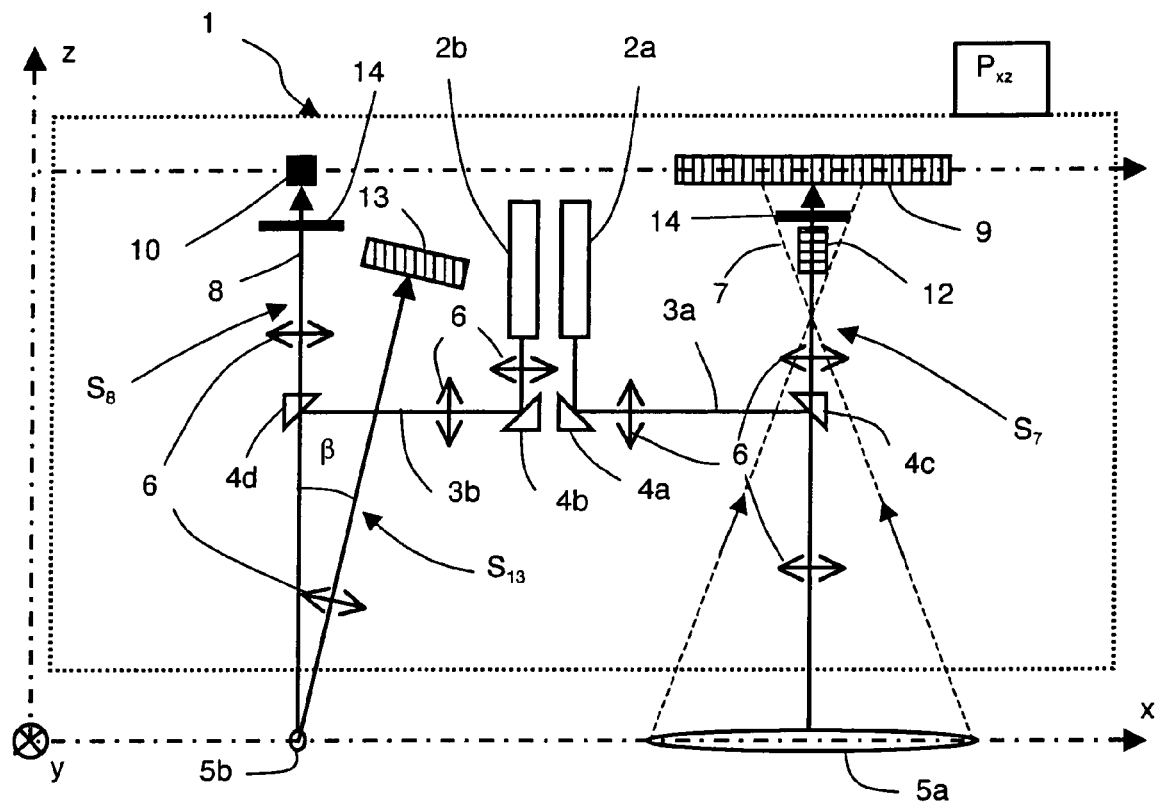
FIG. 1 schematically represents a front view of an optical device for measuring velocity according to the invention.
Figure 2:
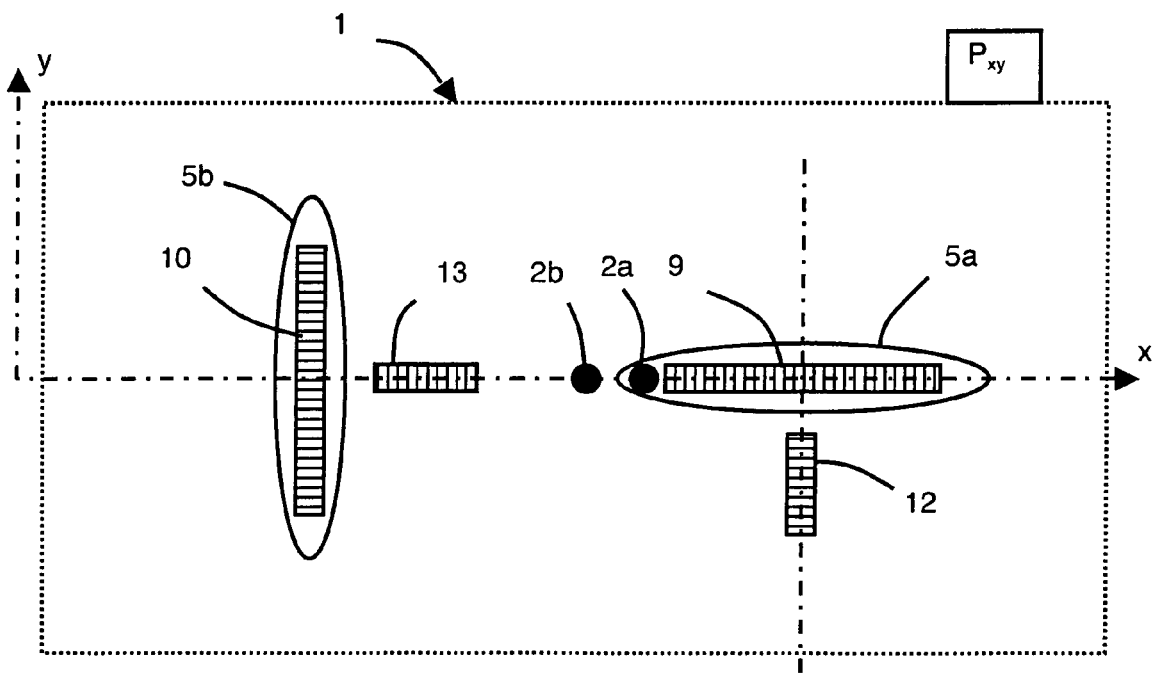
FIG. 2 schematically represents a top view of the optical measuring device according to FIG. 1.

In FIGS. 1 to 3, the optical measuring device 1 is designed to measure the longitudinal displacement velocity and/or the transverse displacement velocity of a first moving element, for example a car, with respect to a second element, for example the ground. Considering a reference coordinates system x, y and z, represented in FIG. 1, the front view of the device 1, represented in FIG. 1, corresponds to the plane Pxz, the top view of the device 1, represented in FIG. 2, corresponds to the plane Pxy and the side view of the device 1, represented in FIG. 3, corresponds to the plane Pyz. The device 1 is fixed for example under the body of the car, which moves in the positive direction along the x-axis, substantially parallel to the ground.

In the particular embodiment illustrated in FIGS. 1 to 3, the device 1 comprises two lasers 2a, 2b which project two incident light beams 3a, 3b on the ground. The lasers 2a, 2b are preferably arranged in a central zone of the device 1 and directed along the z-axis, i.e. perpendicularly to the ground. To direct the incident beams 3a and 3b respectively towards the front and the rear of the device 1, the latter comprises prisms 4a to 4d. The prisms 4a and 4b, respectively arranged facing the lasers 2a and 2b, are reflecting prisms directed in such a way as to reflect all the incident light in a direction substantially parallel to the ground respectively towards the prisms 4c and 4d, that are also reflecting, located respectively at the front and rear of the device 1. The prisms 4c and 4d are directed in such a way as to reflect all the incident light coming from the prisms 4a and 4b in the direction of the ground, substantially perpendicularly thereto.

The incident beams 3a, 3b are therefore projected onto the ground so as to form two laser spots 5a, 5b respectively parallel to the x-axis at the front of the device 1 and parallel to the y-axis at the rear of the device 1. The projected light is then back-scattered by the ground in the direction of the device 1. The device 1 also comprises focusing means, for example lenses 6. In FIG. 1, lenses 6 are notably arranged respectively between the laser 2b and the prism 4b, between the prisms 4b and 4d, between the prisms 4a and 4c, between the prism 4c and the ground, and above the prisms 4c and 4d. The light scattered by the spots 5a and 5b, around the prisms 4c and 4d, is focused by the lenses 6 and thus forms two back-scattered light beams, directed upwards, one 7 at the front of the device 1 and the other 8 at the rear of the device 1, respectively along two optical axes, a front optical axis $S_7$ and a rear optical axis $S_8$ (FIG. 1).

The light scattered by the ground and received by the device 1 is then detected by front and rear detection means, for example by a front photosensitive array 9 and by a rear photosensitive array 10, respectively perpendicular to the associated front optical axis $S_7$ and rear optical axis $S_8$. The front photosensitive array 9 is arranged on the x-axis, on the path of the car (FIG. 1), whereas the rear photosensitive array 10 is arranged on the y-axis, substantially perpendicularly to this path (FIGS. 2 and 3). This type of detector conventionally comprises a plurality of elements which deliver electrical signals that are a function of the quantity of light received on each of the elements of the array. This enables values representative of the positions of the impact of the scattered light on the front array 9 and rear array 10, corresponding to the location of the light intensity maxima measured by the arrays 9 and 10, to be measured quickly.

In known manner, the signals provided by the front photosensitive array 9 enable very small longitudinal velocities of the car to be computed, whereas the signals provided by the rear photosensitive array 10, in correlation with the signals provided by the front photosensitive array 9, enable the transverse velocity and/or the longitudinal velocity of the car to be computed. The device 1 comprises a processing circuit 11 (FIG. 4), not represented in FIGS. 1 to 3 for the sake of clarity, connected to the front photosensitive array 9 and the rear photosensitive array 10, which determines the different values of the velocity (block 14) according to the signals provided by the front photosensitive array 9 and the rear photosensitive array 10.

To compute very small longitudinal velocities, the processing circuit 11 uses only the signals provided by two elements of the front photosensitive array 9. To compute the longitudinal velocity and/or the transverse velocity, the processing circuit 11 uses the signals provided by the front photosensitive array 9 and the rear photosensitive array 10.

To improve these velocity computations, the device 1 comprises additional detection means, arranged respectively at the front and at the rear of the device 1. These means are for example formed by a front additional photosensitive array 12 and a rear additional photosensitive array 13 designed to perform measuring of the distance H between the device 1 and the ground. In particular, the front additional array 12 enables the distance H1 between the front of the device 1 and the ground to be computed (FIG. 3), and the rear additional array 13 enables distance H2 between the rear of the device 1 and the ground to be computed (FIG. 3). Computation of the distances H1 and H2 is then used to correct the values of the initially computed velocities, so as to obtain a much more reliable device 1.

As represented in FIGS. 1 to 3, the light scattered by the ground in the width of the spots 5a and 5b is detected respectively by the front additional array 12 and the rear additional array 13 with angles of reflection α and β enabling a height to be measured by triangulation. The front additional photosensitive array 12 and rear additional photosensitive array 13 are for example arranged substantially under and away from the front photosensitive array 9 and rear photosensitive array 10.

As represented in FIGS. 2 and 3, the front additional array 12 is positioned away from the plane Pxz (FIG. 1) defined by the front photosensitive array 9 and the front optical axis $S_7$, and under the front photosensitive array 9 (FIGS. 1 and 3). The projection of the front additional array 12 in the plane Pxy is arranged on an axis parallel to the y-axis, perpendicular to the longitudinal axis of the front photosensitive array 9 and passing through the centre thereof (FIG. 2). The front additional array 12 is, in the plane Pyz, inclined with respect to the y and z axes (FIG. 3). The light scattered by the ground is focused on the array 12, preferably by means of a lens 6, along an additional optical axis $S_{12}$ perpendicular to the front additional array 12. The optical axis $S_{12}$ is inclined, in the plane Pyz, with respect to the front optical axis $S_7$ by an angle α, so that the front additional array 12 performs distance measurement by triangulation.

As represented in FIGS. 1 and 2, the rear additional array 13 is positioned away from the plane Pyz (FIG. 3) defined by the rear photosensitive array 10 and the rear optical axis $S_8$, and under the rear photosensitive array 10 (FIGS. 1 and 3). The projection of the rear additional array 13 in the plane Pxy is disposed on an axis parallel to the x-axis, perpendicular to the longitudinal axis of the rear photosensitive array 10 and passing through the centre thereof (FIG. 2). The rear additional array 13 is inclined, in the plane Pxz, with respect to the x and z axes (FIG. 1). The light scattered by the ground is focused on the array 13, preferably by means of a lens 6, along an additional optical axis $S_{13}$ perpendicular to the rear additional array 13. The optical axis $S_{13}$ is inclined, in the plane Pxz, with respect to the rear optical axis $S_8$ by an angle β, so that the rear additional array 13 performs distance measurement by triangulation.

In the particular embodiment represented in FIG. 4, the processing circuit 11, to which the front 9, the rear 10 and additional 12, 13 photosensitive arrays are connected, determines (block 15) the distances H1 and H2, according to the known principle of optical triangulation, from the signals provided by the front additional 12 and rear additional 13 arrays. The processing circuit 11 then determines (block 16) a front optical magnification value G1 and a rear optical magnification value G2 of the optical receiving means, from the values H1 and H2. In the particular case represented in FIGS. 1 and 3, the front 7 and rear 8 scattered beams are focused by the thin lenses 6, the focusing point of the front 7 and rear 8 scattered beams being located in the centre of the respective lenses 6 (represented by the arrows $S_7$ and $S_8$ in FIGS. 1 and 3). The magnifications G1 and G2 are then expressed according to the following mathematical formulas:

$$G1 = ((H1/\cos \alpha) - d0_1)/d0_1 \text{ and } G2 = ((H2/\cos \beta) - d0_2)/d0_2$$

where $d0_1$ is a known fixed distance representing the distance between the front focusing point and the front additional array 12 and $d0_2$ is a known fixed distance representing the distance between the rear focusing point and rear additional array 13.

From the magnification values G1 and G2 thus determined, the processing circuit 11 determines (block 17) the corrected values of the previously computed (block 14) longitudinal displacement velocity and/or transverse displacement velocity of the car, with an estimated initial magnification value G. The device 1 thus enables precise and optimised velocity values to be obtained at each measuring moment, due to the fact that the distances H1 and H2 are taken into account.

Moreover, the processing circuit 11 can comprise means designed to amplify, filter, sample and digitize the analog signals supplied by the photosensitive arrays 9, 10, 12 and 13 of the device 1.

Such an optical measuring device 1 provides in particular the following advantages. Measurement of the heights H1 and H2 is precise, for at a distance H of about 20 cm, the precision is up to 0.3 mm. No restriction is to be made in estimation of the longitudinal or transverse velocity. Three measurements, i.e. the longitudinal velocity, transverse velocity and height H, are made from a single device 1 performing these three functions. The algorithms incorporated in the processing circuit 11 enable the velocities and the magnification to be computed in parallel, and one to be taken into account to correct the other.

Self-correction of the magnification effect on the estimation of the longitudinal and transverse velocities is possible without using a special element such as a diaphragm. The optical settings are then simple, as there is no diaphragm centring to be performed. The device 1 can operate with a relatively large height range, a relatively wide drift angle, and more or less high longitudinal velocities. There is no computing time loss, due to the fact that the triangulation algorithms operate in parallel to compute the distances H1 and H2, and in correlation, for computing the velocities. Moreover, the signal level of the light scattered by the ground is increased, as no diaphragm is used.

The invention is not limited to the different embodiments described above. The detection means can in particular be chosen from discrete photodiodes, photodiode arrays, CCD devices using MOS phototransistors, linear photodiode/MOS arrays (photodiode on transfer register).

The means for directing the incident beams 3a, 3b can be formed by mirrors. Different types of emission means can be used depending on the applications, i.e. monochromatic, polychromatic, constant lighting or modulated lighting light sources, by means of lasers or infrared sources or white light sources.

The distance between the front photosensitive array 9 and rear photosensitive array 10 can vary depending on the type of measurement to be made. For measuring very high longitudinal velocities, the front 9 and rear 10 photosensitive arrays will be separated by a relatively large distance, for example about 90 mm, for velocities of several hundred km/h.

As represented in FIGS. 1 and 3, the device 1 can comprise filters 14 at the front and rear of the device 1, more particularly on the path of the light scattered by the ground, close to the photosensitive arrays 9 and 10, so as to filter only the light necessary for measurement.

In an alternative embodiment (not represented), the device 1 can be fixed on the ground and the lasers 2a, 2b project the light onto a car passing over the device 1, operation of the device 1 remaining the same.

Such an optical measuring device 1 is applied in particular to measuring the velocity and displacement of a moving object in which the device 1 is fitted (car, train, etc). Another application can be computing the height and the speed at which objects are running on production lines (for sorting purposes, recognition of manufactured objects, etc). Another application can also be measuring the speed at which wires or rods are running on production lines (spinning, weaving, etc.).

The invention claimed is:

1. An optical measuring device for measuring the displacement velocity of a first moving element with respect to a second element, said first moving element moving in a displacement plane substantially parallel to the second element, the optical measuring device being fixed to one of the two elements and comprising:
    means for emitting at least one incident light beam in the direction of the other element,
    means for receiving the light scattered by the other element, comprising front and rear detection means arranged substantially perpendicularly to one another, as well as an additional detection means,
    processing means, connected to the front and rear detection means and comprising means for determining the longitudinal and/or transverse displacement velocity of the first moving element, said
    processing means, connected to the additional detection means, comprising means for determining, by optical triangulation, the distance between the device and the other element, in a plane perpendicular to said displacement plane, and correction means for determining corrected values of the longitudinal and/or transverse displacement velocity according to said distance and to the values supplied by the means for determining the longitudinal and/or transverse displacement velocity of the moving element.

2. Device according to claim 1, wherein the additional detection means comprise front additional detection means arranged at the front of the device, away from a plane defined by the front detection means and an optical axis associated with the front detection means.

3. Device according to claim 2, wherein the means for determining the distance comprise means for determining a front distance, between the front of the device and the other element, from signals supplied by the front additional detection means, the processing means comprising determining means to determine a front optical magnification of the optical receiving means, from the front distance.

4. Device according to claim 1, wherein the additional detection means comprise rear additional detection means arranged at the rear of the device, away from a plane defined by the rear detection means and an optical axis associated with the rear detection means.

5. Device according to claim 4, wherein the means for determining the distance comprise means for determining a rear distance, between the rear of the device and the other element, from signals supplied by the rear additional detection means, the processing means comprising determining means to determine a rear optical magnification of the optical receiving means, from the rear distance.

6. Device according to claim 3, wherein the correction means take into account the optical magnification values determined to correct the velocity values.

7. Device according to claim 1, wherein the detection means of the device are photosensitive arrays.

8. Device according to claim 1, wherein the emitting means of the device comprise at least one laser.

9. Device according to claim 1, comprises focusing means to focus the scattered light on the front, rear and additional detection means.

* * * * *